US008028909B2

(12) United States Patent
Brock et al.

(10) Patent No.: US 8,028,909 B2
(45) Date of Patent: Oct. 4, 2011

(54) INTEGRATED IMAGE QUALITY TEST FOR IMAGING SYSTEM

(75) Inventors: Christopher Warren Brock, Manorville, NY (US); Jonathan Chin, North Babylon, NY (US); Christopher Fjellstad, Smithtown, NY (US); David P. Goren, Smithtown, NY (US); Patrick Mauro, Lake Grove, NY (US); David Tsi-Shi, Stony Brook, NY (US); Michael Steele, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/315,026

(22) Filed: Nov. 26, 2008

(65) Prior Publication Data

US 2010/0127078 A1 May 27, 2010

(51) Int. Cl.
*G06K 7/00* (2006.01)
(52) U.S. Cl. ....................................................... 235/438
(58) Field of Classification Search ................... 235/438
See application file for complete search history.

(56) References Cited

U.S. PATENT DOCUMENTS

| 5,440,142 | A | * | 8/1995 | Maddox | 250/566 |
| 5,504,315 | A | * | 4/1996 | Hardesty et al. | 235/454 |
| 5,959,282 | A | * | 9/1999 | Tabuchi | 235/462.01 |
| 2004/0004125 | A1 | * | 1/2004 | Havens et al. | 235/462.22 |
| 2005/0275724 | A1 | * | 12/2005 | Albertelli | 348/187 |
| 2006/0060655 | A1 | * | 3/2006 | Tsunobuchi et al. | 235/462.48 |

* cited by examiner

*Primary Examiner* — Daniel Hess
*Assistant Examiner* — David Tardif
(74) *Attorney, Agent, or Firm* — Nonggiang Fan

(57) ABSTRACT

An imaging system with in-field image quality testing and reporting features, includes a housing, and a solid-state imager having an array of image sensors supported by the housing for capturing return light from a target located in a range of working distances from the housing in an image capture mode of operation, and for capturing return light from a test pattern positioned at a predetermined position in the range of working distances in a test mode of operation different from the image capture mode. An electrical signal indicative of the captured return light is generated in each mode. A memory is supported by the housing for storing a test program for testing image quality. A controller is supported by the housing for processing the electrical signal in the image capture mode, and for accessing the memory to enable the controller to execute the test program in the test mode to test the image quality of the test pattern imaged by the imaging system, and for reporting test results of the image quality of the test pattern.

21 Claims, 3 Drawing Sheets

INTEGRATED IMAGE QUALITY TEST FOR IMAGING SYSTEM

DESCRIPTION OF THE RELATED ART

Solid-state imaging systems, in both handheld and hands-free modes of operation, have been used in supermarkets, warehouse clubs, department stores, and other kinds of retailers for many years, to electro-optically capture data from various targets, by reading one-dimensional bar code symbols, particularly of the Universal Product Code (UPC) type, each leaving a row of bars and spaces spaced apart along a scan direction, and by reading two-dimensional symbols, such as Code 49, which introduced the concept of vertically stacking a plurality of rows of bar and space patterns in a single symbol as described in U.S. Pat. No. 4,794,239, as well as by capturing images of non-symbol targets, such as persons, places, or things. For example, the image of a consumer, or the consumer's signature, or the consumer's driver's license might be captured for the purpose of age verification in the event that tobacco or alcoholic products are desired to be purchased. Another example of a two-dimensional code structure for increasing the amount of data that can be read by an imaging system is known as PDF417 and is described in U.S. Pat. No. 5,304,786.

The known solid-state imaging system includes an imager having a one- or two-dimensional array of cells or photosensors, which correspond to image elements or pixels in a field of view of the imager, and an imaging lens assembly for capturing light from the target and projecting the captured light onto the imager. Such an imager may include a one- or two-dimensional charge coupled device (CCD) or a complementary metal oxide semiconductor (CMOS) device, and is analogous to the imager used in a digital consumer camel-a to capture images. The imaging lens assembly includes optical elements for capturing the light over a range of working distances in which the target can be located.

The known imaging system further typically includes an illuminator to illuminate the target, either a symbol or a non-symbol, during image capture with illumination light emitted from an illumination light source and directed to the target for reflection and scattering as return light therefrom. The illumination light source may be located within and/or externally of the system, and typically comprises one or more light emitting diodes (LEDs). To assist an operator in locating a desired target, the imaging system is often equipped with an aiming assembly having an aiming laser for generating a laser beam, and aiming optics for generating a visible aiming pattern, such as a "crosshair" pattern, from the laser beam. The operator trains the aiming pattern on the target to be imaged during an aiming mode prior to image capture. The system yet further includes electronic circuitry for processing electrical signals generated by the imager and indicative of the return light captured by the array, and a microprocessor for either decoding the electrical signals to read the captured image from a symbol target, or for processing the captured image from a non-symbol target for storage and display.

It is therefore known to use a solid-state imaging system for capturing a monochrome image of a target as, for example, disclosed in U.S. Pat. No. 5,703,349. It is also known to use a solid-state imaging system with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

In the hands-free mode, the operator may slide or swipe a product bearing a target past a window of the system in either horizontal and/or vertical and/or diagonal directions, in a "swipe" mode. Alternatively, the operator may present the target to an approximate central region of the window in a "presentation" mode. The choice depends on operator preference or on the layout of a workstation in which the imaging system is used.

In the handheld mode, the operator holds the system in his or her hand during image capture and aims the system at the target. The operator may first lift the system from a countertop or a support stand or cradle. Once image capture is completed, the operator may return the system to the countertop or to the support stand to resume hands-free operation. A mode switch is typically provided on the system and/or on the support stand to configure the system in the appropriate handheld or hands-free mode.

Although the known imaging system is generally satisfactory for its intended purpose of reading symbols and/or acquiring images, one concern relates to the quality of the captured image. The operator or system maintenance personnel often wish to know whether the system is meeting its technical specifications, especially over its working lifetime, and whether the perceived quality of the captured image matches what is expected in terms of such image characteristics as resolution, illumination consistency, modulation transfer function (MTF), etc., or whether such image characteristics have degraded with the passage of time and use and, if so, whether the degraded characteristics are so out-of-specification as to warrant the return of the system to the system supplier for repair or replacement.

Such image characteristics cannot be determined or measured by observation, except perhaps by specially trained expert personnel, and, as a result, the system maintenance personnel are typically forced to enter into a dialog with the system supplier, often requiring the system to go out of service, typically for a long time, while the quality question is resolved. The prospect of lengthy system unavailability may force repairs or replacement to be delayed or ignored.

Such image characteristics can be determined or measured by special purpose computer software operative to test captured image quality. This requires the system maintenance personnel to purchase such testing software and corresponding equipment to execute the testing software, and also requires training in how to operate such testing software and how to interpret the test results. This procedure may be too complex for some maintenance personnel to perform, and, in any event, may cause the system to go out of service for an extended time. It would be desirable to test captured image quality in the field, and with minimum downtime.

SUMMARY OF THE INVENTION

One feature of the present invention resides, briefly stated, in an imaging system for, and a method of, testing image quality and, in turn, imaging system performance. The system has a solid-state imager in a housing. The imager includes an array, preferably a CCD or a CMOS array, of image sensors supported by the housing for capturing return light, preferably with the aid of an imaging lens assembly, from a target, e.g., a one- or two-dimensional bar code symbol, or a non-symbol target, located in a range of working distances from the housing in an image capture mode of operation. A controller or programmed microprocessor is also supported by the housing and processes the electrical signal in the image capture mode. If the target is a symbol, then the controller is operative for decoding the electrical signal into data indicative of the symbol, and for determining and indicating that the symbol has been successfully decoded and read. If the target is a non-symbol target, then the controller processes the electrical signal into data that can be stored and displayed.

As previously described, the operator or system maintenance personnel often wish to know whether the imaging system is meeting its technical specifications, especially over its working lifetime, and whether the perceived quality of the captured image matches what is expected in terms of such image characteristics as resolution, illumination consistency, modulation transfer function (MTF), etc., or whether such image characteristics have degraded with the passage of time and use and, if so, whether the degraded characteristics are so out-of-specification as to warrant the return of the system to the system supplier for repair or replacement.

Hence, one feature of the present invention involves positioning a test pattern at a predetermined position in the range of working distances in a test mode of operation different from the image capture mode. The imager is also operative for capturing return light from the test pattern in the test mode. A memory is supported by the housing, preferably by being integrated with the controller, for storing a test program for testing image quality. The controller is also operative for accessing the memory to enable the controller to execute the test program in the test mode to test the image quality of the test pattern imaged by the imaging system.

Thus, system maintenance personnel are no longer forced to rely on their observation of the captured image, or enter into a lengthy dialog with the system supplier, or purchase special purpose image quality testing software and corresponding computer equipment to execute the testing software, or train in how to operate such testing software and how to interpret the test results. System downtime is minimized, because the testing is performed in the field in situ at the system.

In a preferred embodiment, the test pattern is a resolution chart having elements of different light reflectivity and of different dimensions. The test program is operative for processing the electrical signal in the test mode to measure a resolution of the imager. The imaging lens assembly is operative for focusing the return light from an imaging plane onto the array. The test pattern is preferably positioned at the imaging plane.

Advantageously, the controller may automatically enter the test mode upon processing the electrical signal which the controller self-recognizes is indicative of the test pattern, or when a special self-configuring test symbol is read. Alternatively, the controller may enter the test mode upon receipt of a command signal from a remote host, such as a cash register, via a wired or wireless link. The controller may also manually enter the test mode by having the operator depress or actuate an actuating switch.

It is also desirable for the controller to report the test results of the image quality of the test pattern. The results can be presented auditorily, or visually, e.g., alphanumerically or graphically, on paper or on a monitor, or superimposed on the test image. It is especially advantageous if the controller visually indicates where on the test pattern the image quality was tested, e.g., by drawing lines through selected areas of the test image. The results can even be reported by a "GO" or a "NO GO" signal, which indicates whether the results are within or outside the system's specifications.

The method of testing image quality is performed by capturing return light from a target located in a range of working distances from a housing in an image capture mode of operation of an imaging system, capturing return light from a test pattern positioned at a predetermined position in the range of working distances in a test mode of operation different from the image capture mode, generating an electrical signal indicative of the captured return light in each mode, storing a test program for testing image quality in a memory supported by the housing, processing the electrical signal in the image capture mode, and accessing the memory and executing the test program in the test mode to test the image quality of the test pattern imaged by the imaging system.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
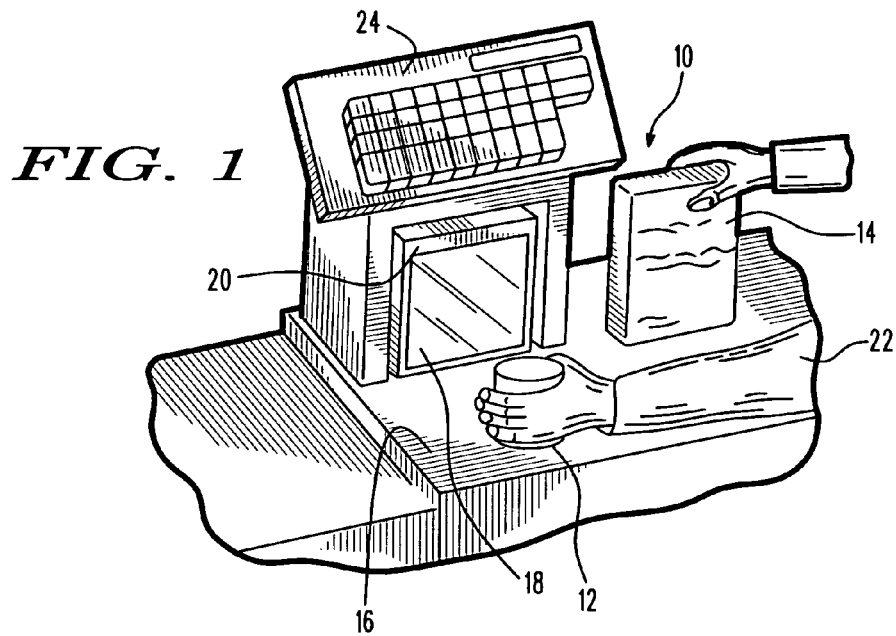
FIG. 1 is a perspective view of a portable imaging system operative in a hands-free image capture mode for capturing light from targets to be electro-optically read.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past, or presented to, a generally vertical or upright planar window 18 of a portable, box-shaped, vertical slot reader or imaging system 20 mounted on the countertop 16. A checkout clerk or operator 22 is located at one side of the countertop, and the imaging system 20 is located at the opposite side. A host computer or cash/credit register 24 is located within easy reach of the operator. The operator 22 can also hold the imaging system 20 in one's hand during imaging.

Figure 2:
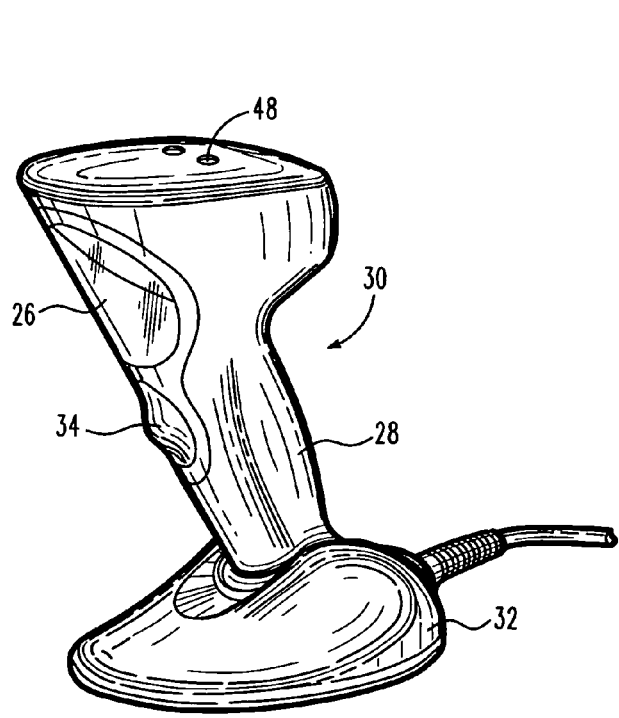
FIG. 2 is a perspective view of another portable imaging system operative in either a hand-held, or a hands-free, image capture mode, for capturing light from targets to be electro-optically read.

Reference numeral 30 in FIG. 2 generally identifies another imaging system having a different configuration from that of imaging system 20. Imaging system 30 also has a generally vertical or upright window 26 and a gun-shaped housing 28 supported by a base 32 for supporting the imaging system 30 on a countertop. The imaging system 30 can thus be used as a stationary workstation in which products are slid or swiped past, or presented to, the vertical window 26, or can be picked up off the countertop and held in the operator's hand and used as a handheld imaging system in which a trigger 34 is manually depressed to initiate imaging of a target. In another variation, the base 32 can be omitted.

Figure 3:
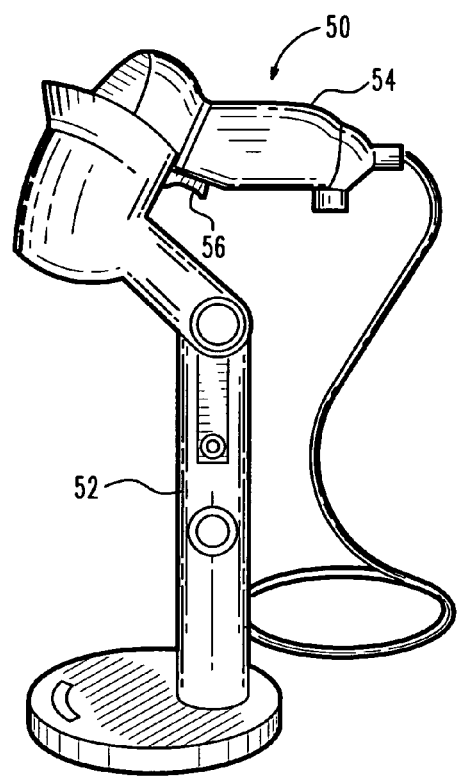
FIG. 3 is a perspective view of still another portable imaging system operative in either a hand-held, or a hands-free, image capture mode, for capturing light from targets to be electro-optically read.

Reference numeral 50 in FIG. 3 generally identifies another portable, electro-optical imaging system having yet another operational configuration from that of imaging systems 20, 30. System 50 has a window and a gun-shaped housing 54 and is shown supported in a workstation mode by a stand 52 on a countertop. The system 50 can thus be used as a stationary workstation in which products are slid or swiped past its window, or can be picked up off the stand and held in the operator's hand in a handheld mode and used as a handheld system in which a trigger 56 is manually depressed to initiate reading of the symbol.

Figure 4:
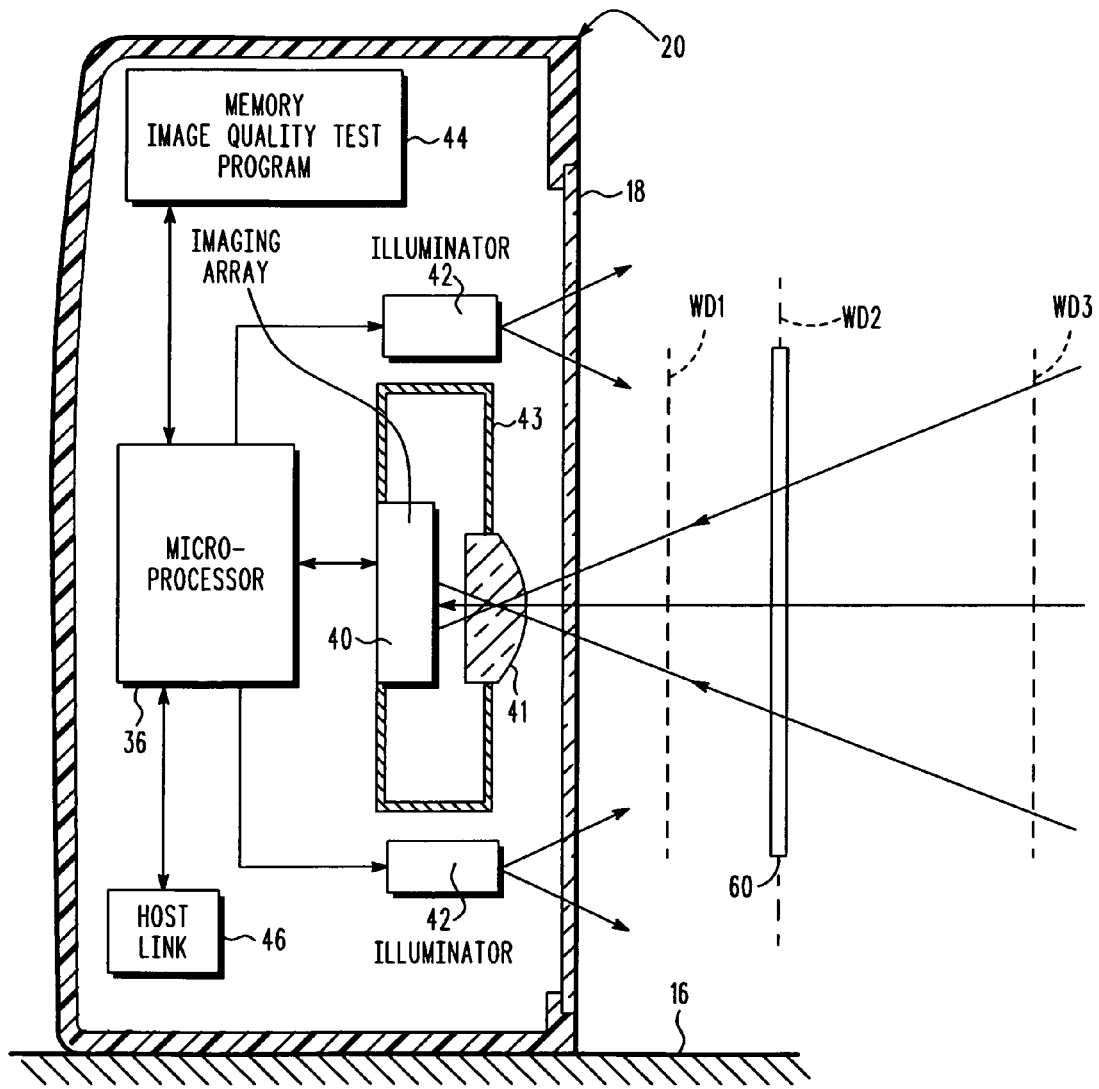
FIG. 4 is a schematic diagram of various components of the system of FIG. 1 in accordance with the present invention.

Each system 20, 30, 50 includes, as shown for representative system 20 in FIG. 4, an imager 40 and an imaging lens assembly 41 that are mounted in an enclosure 43. The imager 40 is a solid-state device, for example, a CCD or a CMOS imager and has a linear or area array of addressable image sensors or pixels operative for capturing return light through the window 18 from a target, for example, a one- or a two-dimensional symbol, or a non-symbol target, over a field of view and located in a working range of distances between a close-in working distance (WD1) and a far-out working distance (WD3). The imaging lens assembly 41 focuses the return light from a focal or imaging plane at a distance WD2 within the range. In a preferred embodiment, WD1 is about one inch from the window 18, WD2 is about six inches from the window 18, and WD3 is over twelve inches from the window 18. Other numerical values for these distances are contemplated by this invention.

An illuminator is also mounted in the imaging system and preferably includes a plurality of light sources, e.g., light emitting diodes (LEDs) 42, arranged to uniformly illuminate the symbol. As shown in FIG. 4, the imager 40 and the illuminator LEDs 42 are operatively connected to a controller or microprocessor 36 operative for controlling the operation of these components. Preferably, the microprocessor 36 is the same as the one used for decoding the return light scattered from target symbols, and for processing captured images from non-symbol targets.

In operation, the microprocessor 36 sends a command signal to pulse the illuminator LEDs 42 for a short time period, say 500 microseconds or less, and energizes the imager 40 to collect light from a target only during said time period. A typical array needs about 16 to 33 milliseconds to acquire the entire target image and operates at a frame rate of about 30 to 60 frames per second. The array may have on the order of one million addressable image sensors. Frequently, the illuminator LEDs 42 are pulsed for a few milliseconds, especially when working at extended ranges where it is difficult to illuminate the symbol target as brightly. Under these circumstances, the illumination may be activated for up to around 30 ms.

As previously described, the operator or system maintenance personnel often wish to know whether any of the imaging systems 10, 30, 50 is meeting its technical specifications, especially over its working lifetime, and whether the perceived quality of the captured image matches what is expected in terms of such image characteristics as resolution, illumination consistency, modulation transfer function (MTF), etc., or whether such image characteristics have degraded with the passage of time and use and, if so, whether the degraded characteristics are so out-of-specification as to warrant the return of the system to the system supplier for repair or replacement.

Hence, one feature of the present invention involves positioning a test pattern or chart 60 at a predetermined position, e.g., WD2 (see FIG. 4), in the range of working distances in a test mode of operation different from the handheld, or hands-free, image capture mode. The imager 40 is also operative for capturing return light from the test pattern 60 in the test mode. A memory 44 is supported by the housing, preferably by being integrated with the controller 36, but could also be implemented as a separate memory chip, for storing a test program for testing image quality. The controller 36 is also operative for accessing the memory 44 to enable the controller 36 to execute the test program in the test mode to test the image quality of the test pattern 60 imaged by the imaging system.

Thus, system maintenance personnel are no longer forced to rely on their observation of the captured image, or enter into a lengthy dialog with the system supplier, or purchase special purpose image quality testing software and corresponding computer equipment to execute the testing software, or train in how to operate such testing software and how to interpret the test results. System downtime is minimized, because the testing is performed in the field in situ at the system.

Figure 5:
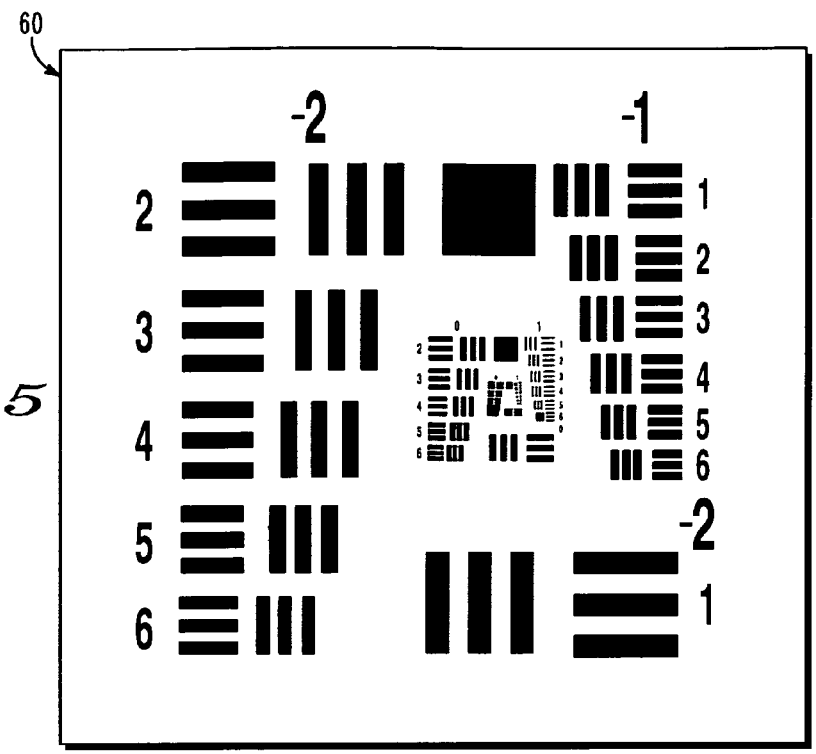
FIG. 5 is a front view of a test pattern to be imaged by the systems of FIGS. 1-3 in a test mode of operation.

In a preferred embodiment, the test pattern 60 is a resolution chart having elements of different light reflectivity and of different dimensions. FIG. 5 depicts the standard 1951 United States Air Force (USAF) resolution test chart. The USAF 1951 chart consists of a plurality of patterns of three horizontal bars and three vertical bars, of different resolutions, often covering a range of 0.25 to 645.0 cycles/mm. As depicted in Table I below, there can be eleven groups, each designated by a group number (−2, −1, 0, 1, 2, . . . 9.) which is the power to which 2 should be raised to obtain the spatial frequency of the first element (e.g., group −2 is 0.25 line pairs per millimeter). Each group consists of six elements numbered 1, 2, 3, 4, 5 and 6. Each element is the 6th root of 2 smaller than the preceding element in the group (e.g., element 1 is $2^0$, element 2 is $2^{(-1/6)}$, element 3 is $2^{(-1/3)}$, etc.). By determining the group and element number of the first element which cannot be resolved, the limiting resolution of the imager 40 and the imaging lens assembly 41 may be determined by the test program stored in the memory 44.

TABLE I

Number of Line Pairs/mm in USAF Resolving Power Test Target (1951)

| # | Group Number | | | | | | | | | | | |
|---|---|---|---|---|---|---|---|---|---|---|---|---|
| | −2 | −1 | 0 | 1 | 2 | 3 | 4 | 5 | 6 | 7 | 8 | 9 |
| 1 | 0.250 | 0.500 | 1.00 | 2.00 | 4.00 | 8.00 | 16.00 | 32.0 | 64.0 | 128.0 | 256.0 | 512.0 |
| 2 | 0.280 | 0.561 | 1.12 | 2.24 | 4.49 | 8.98 | 17.95 | 36.0 | 71.8 | 144.0 | 287.0 | 575.0 |
| 3 | 0.315 | 0.630 | 1.26 | 2.52 | 5.04 | 10.10 | 20.16 | 40.3 | 80.6 | 161.0 | 323.0 | 645.0 |
| 4 | 0.353 | 0.707 | 1.41 | 2.83 | 5.66 | 11.30 | 22.62 | 45.3 | 90.5 | 181.0 | 362.0 | — |
| 5 | 0.397 | 0.793 | 1.59 | 3.17 | 6.35 | 12.70 | 25.39 | 50.8 | 102.0 | 203.0 | 406.0 | — |
| 6 | 0.445 | 0.891 | 1.78 | 3.56 | 7.13 | 14.30 | 28.50 | 57.0 | 114.0 | 228.0 | 456.0 | — |

The test program is operative for processing the electrical signal in the test mode to measure the resolution of the imager 40 and the imaging lens assembly 41. A suitable test program that can be used is entitled Imatest Master and can be obtained from Imatest LLC of Colorado.

Advantageously, the controller 36 may automatically enter the test mode upon processing the electrical signal which the controller 36 self-recognizes is indicative of the test pattern, or when a special self-configuring test symbol is read. Alternatively, the controller 36 may enter the test mode upon receipt of a command signal from a remote host, such as the cash register 24, via a wired or wireless link 46 (see FIG. 4). The controller 36 may also manually enter the test mode by having the operator depress or actuate an actuating switch, such as actuator 48 in FIG. 2.

Figure 6:
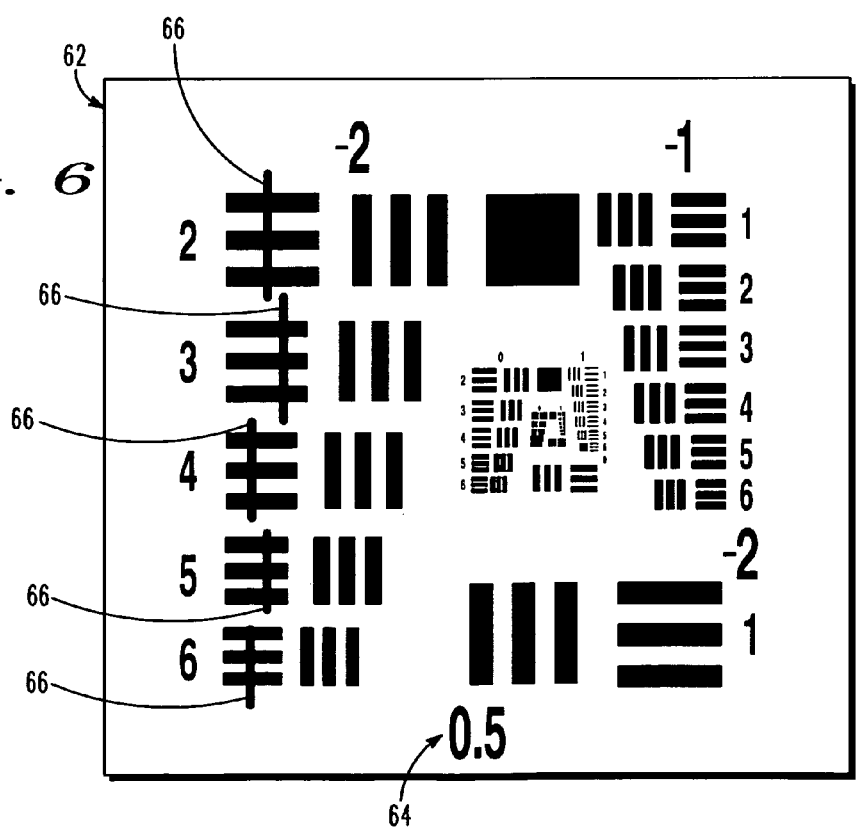
FIG. 6 a front view of an image of the test pattern of FIG. 5, together with test results.

It is also desirable for the controller 36 to report the test results of the image quality of the test pattern. The results can be presented auditorily, or visually, e.g., alphanumerically or graphically, on paper or on a monitor, or superimposed on a test image 62 as depicted in FIG. 6 by the numerical result 64 of "0.5" cycles per mm. It is especially advantageous if the controller 36 visually indicates where on the test pattern the image quality was tested, e.g., by drawing lines 66 through selected areas of the test image 62. The results can even be reported by a "GO" or a "NO GO" signal, which indicates whether the results are within or outside the system's specifications.

It will be understood that each of the elements described above, or two or more together, also may find a useful application in other types of constructions differing from the types described above. Thus, imaging systems having different configurations can be used. In the preferred embodiment, the imaging systems are mounted in handheld housings. Also, image quality tests, other than resolution, can be measured.

While the invention has been illustrated and described as an imaging system with integrated image quality testing and reporting functions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging system, comprising:
    a housing;
    an illuminator mounted in the imaging system including a plurality of light sources arranged to uniformly illuminate a target;
    a solid-state imager having an array of image sensors supported by the housing for capturing return light from the target located in a range of working distances from the housing in an image capture mode of operation, and for capturing return light from a test pattern positioned at a predetermined position in the range of working distances in a test mode of operation different from the image capture mode, and for generating an electrical signal indicative of the captured return light in each mode;
    a memory supported by the housing for storing an embedded test program for testing image quality;
    a controller supported by the housing for processing the electrical signal in the image capture mode operative to decode the electrical signal from a symbol on the target into data indicative of the symbol, and for accessing the memory to enable the controller to execute the embedded test program in the test mode to test the image quality of the test pattern imaged by the imaging system to measure at least a spatial resolution of the imaging system in situ when the test pattern is illuminated by the illuminator; and
    wherein the test pattern includes a resolution chart having elements of different spatial resolutions, and the embedded test program is operative for processing the electrical signal in the test mode to measure the spatial resolution of the imager by determining the smallest spatial resolution in the resolution chart that can be resolved by the imaging system.

2. The system of claim 1, wherein the test pattern includes a resolution chart having elements of different light reflectivity.

3. The system of claim 1, wherein the imager includes an imaging lens assembly operative for focusing the return light from an imaging plane onto the array, and wherein the predetermined position of the test pattern is at the imaging plane.

4. The system of claim 1, wherein the memory is integrated with the controller.

5. The system of claim 1, wherein the controller is further operative for automatically entering the test mode upon processing the electrical signal indicative of the test pattern.

6. The system of claim 1, wherein the controller is further operative for entering the test mode upon command from a remote host.

7. The system of claim 1, wherein the controller is further operative for manually entering the test mode.

8. The system of claim 1, wherein the controller is further operative for reporting test results of the image quality of the test pattern.

9. The system of claim 8, wherein the controller is further operative for visually indicating where on the test pattern the image quality was tested.

10. The system of claim 1, wherein the resolution chart includes a first element having three bars with a first spatial resolution and a second element having three bars with a second spatial resolution.

11. An imaging system with in-field image quality testing and reporting, comprising:
    a housing;
    an illuminator mounted in the imaging system including a plurality of light sources arranged to uniformly illuminate a target;
    a solid-state imager having an array of image sensors supported by the housing for capturing return light from the target located in a range of working distances from the housing in an image capture mode of operation, and for capturing return light from a test pattern positioned at a predetermined position in the range of working distances in a test mode of operation different from the image capture mode, and for generating an electrical signal indicative of the captured return light in each mode;
    a memory supported by the housing for storing an embedded test program for testing image quality;
    a controller supported by the housing for processing the electrical signal in the image capture operative to decode the electrical signal from a symbol on the target into data indicative of the symbol, and for accessing the memory to enable the controller to execute the embedded test program in the test mode to test the image quality of the test pattern imaged by the imaging system to measure at least a spatial resolution of the imaging system in situ when the test pattern is illuminated by the illuminator, and for reporting test results of the image quality of the test pattern; and wherein the test pattern includes a resolution chart having elements of different spatial resolutions, and the embedded test program is operative for processing the electrical signal in the test mode to measure the spatial resolution of the imager by determining the smallest spatial resolution in the resolution chart that can be resolved by the imaging system.

12. A method of testing image quality, comprising the steps of:

illuminating a target with an illuminator mounted in the imaging system including a plurality of light sources;

capturing return light from the target located in a range of working distances from a housing in an image capture mode of operation of an imaging system;

illuminating a test pattern target with the illuminator;

capturing return light from the test pattern positioned at a predetermined position in the range of working distances in a test mode of operation different from the image capture mode;

generating an electrical signal indicative of the captured return light in each mode;

storing an embedded test program for testing image quality in a memory supported by the housing;

processing the electrical signal in the image capture mode, and if the target is a symbol, decoding the electrical signal into data indicative of the symbol;

accessing the memory, and executing the embedded test program, in the test mode to test the image quality of the test pattern imaged by the imaging system to measure at least a spatial resolution of the imaging system in situ when the test pattern is illuminated by the illuminator; and wherein the test pattern includes a resolution chart having elements of different spatial resolutions, and the embedded test program is operative for processing the electrical signal in the test mode to measure the spatial resolution of the imager by determining the smallest spatial resolution in the resolution chart that can be resolved by the imaging system.

13. The method of claim 12, and configuring the test pattern as a resolution chart having elements of different light reflectivity.

14. The method of claim 12, and focusing the return light from an imaging plane, and positioning the test pattern at the imaging plane.

15. The method of claim 12, and integrating the memory with a programmable controller.

16. The method of claim 12, and automatically entering the test mode upon processing the electrical signal indicative of the test pattern.

17. The method of claim 12, and entering the test mode upon command from a remote host.

18. The method of claim 12, and manually entering the test mode.

19. The method of claim 12, and reporting the image quality of the test pattern.

20. The method of claim 19, and visually indicating where on the test pattern the image quality was tested.

21. The method of claim 12, wherein the resolution chart includes a first element having three bars with a first spatial resolution and a second element having three bars with a second spatial resolution.

* * * * *

UNITED STATES PATENT AND TRADEMARK OFFICE
CERTIFICATE OF CORRECTION

| | | |
|---|---|---|
| PATENT NO. | : 8,028,909 B2 | Page 1 of 1 |
| APPLICATION NO. | : 12/315026 | |
| DATED | : October 4, 2011 | |
| INVENTOR(S) | : Brock et al. | |

It is certified that error appears in the above-identified patent and that said Letters Patent is hereby corrected as shown below:

On the Title Page, Item (74), under "Attorney, Agent, or Firm", Line 1, delete "Nonggiang Fan" and insert -- Nongqiang Fan --, therefor.

In Column 1, Line 13, delete "leaving" and insert -- having --, therefor.

In Column 1, Line 35, delete "camel-a" and insert -- camera --, therefor.

Signed and Sealed this
Eighteenth Day of December, 2012

David J. Kappos
*Director of the United States Patent and Trademark Office*